Patented June 3, 1924.

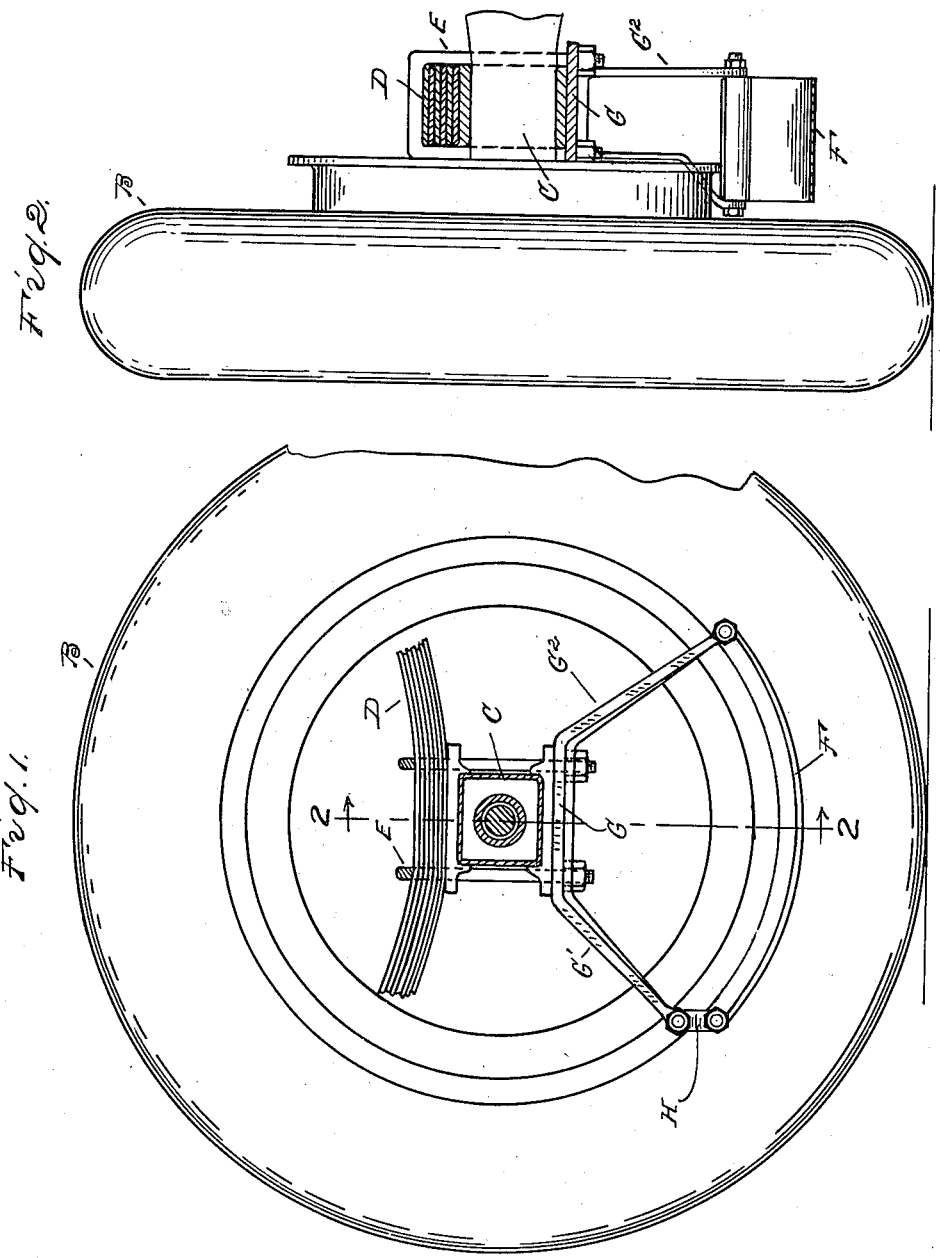

1,496,018

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

PROTECTING DEVICE FOR DEFLATED TIRES OF LOADED-VEHICLE WHEELS.

Application filed January 24, 1921. Serial No. 439,440.

*To all whom it may concern:*

Be it known that I, ALDEN L. PUTNAM, a citizen of the United States of America, residing at Detroit, in the county of Wayne and State of Michigan, have invented certain new and useful Improvements in Protecting Devices for Deflated Tires of Loaded-Vehicle Wheels, of which the following is a specification, reference being had thereto in the accompanying drawings.

The invention relates to vehicle wheels having pneumatic tires, and it is the object of the invention to protect the tire from injury in case of the sudden deflation thereof while the wheel is in movement and under load. The device is particularly applicable to trucks and other vehicles in which the wheel loads are relatively high and avoids the serious injury or destruction of the tire, which might be caused by a single revolution of the loaded wheel when the tire is deflated.

In the drawings:

Figure 1 is a sectional side elevation showing the wheel, axle and protecting device;

Figure 2 is a vertical sectional view taken on line 2—2 of Figure 1.

A is the vehicle wheel, B the pneumatic tire thereon, C the axle housing, D the spring for supporting the vehicle frame on said housing, and E the clips for attaching said spring to the housing. My improvement consists of a shoe F, preferably of segmental form and formed of resilient material. This shoe is so positioned at the side of the wheel that when the tire is inflated, there will be abundant clearance between the shoe and road bed, but upon the deflation of the tire the shoe will take the load and protect the tire case. The connection between the shoe and the axle is formed by a bracket member G, which preferably forms the clip plate for cooperating with the clips E. This bracket has the arms G' and G², one of which is pivotally attached to one end of the shoe while the other is connected with the shoe through a shackle H. The arrangement is such that in case of sudden deflation of the tire, as for instance where there is a blow-out, the resilient shoe will cushion the impact of the dropping vehicle frame and will protect the beads and sides of the tire case. Also the resiliency of the shoe will prevent breaking thereof, while the friction or drag will bring the vehicle quickly to a stop.

What I claim as my invention is:

1. The combination with a pneumatic tired vehicle wheel, of a shoe mounted adjacent to said wheel and independently thereof in a position to clear the road when the tire is inflated, and to sustain the load on the wheel when the tire is deflated.

2. The combination with a pneumatic tired vehicle wheel and an axle supported thereby, of a shoe mounted upon said axle and located in a position adjacent to the tire to clear the road when the tire is inflated and to sustain the load on the wheel and axle when the tire is deflated.

3. The combination with a pneumatic tired vehicle wheel and an axle supported thereby, of a bracket secured to said axle and depending therefrom, and a shoe mounted on said bracket arranged in a position adjacent to the side of the tire, which will clear the road when the tire is inflated and will sustain the load on the wheel and axle when the tire is deflated.

4. The combination with a pneumatic tired vehicle wheel and an axle supported thereby, of a bracket secured to said axle having depending arms, a resilient segmental shoe having one end thereof connected to one of said arms, and a shackle for connecting the other end of said shoe to the other arm, said shoe being positioned to clear the road when the tire is inflated and to sustain the load on the wheel when the tire is deflated.

5. The combination with a pneumatic tired vehicle wheel and an axle supported thereby, of a spring on said axle for sustaining the vehicle frame, a bracket forming a clip plate for said spring and provided with depending arms, and a resilient shoe connected to said depending arms and located to clear the road when the tire is inflated and to sustain the load on the wheel when the tire is deflated.

6. The combination with a pneumatic tired vehicle wheel, of a shoe mounted adjacent said wheel and independently thereof in a position to clear the road when the tire is inflated and to sustain the load when the tire is deflated, said shoe being formed of resilient material to cushion the shock of its impact with the traction surface.

7. The combination with a pneumatic tired vehicle, of a shoe mounted adjacent to said wheel in a position to clear the road when the tire is inflated and to sustain the load upon deflation of the tire, said shoe being formed of resilient material, and means providing for shifting of the point of engagement of said shoe with its support to permit flexing of the shoe under impact with the traction surface.

8. The combination with a pneumatic tired vehicle wheel, of means disposed at the inner side of said wheel immediately operative upon deflation of the tire to relieve the latter of load.

9. The combination with a vehicle axle normally supported by a pneumatic tired wheel, of an emergency support for said axle depending therefrom, a leaf spring for mounting a load upon the axle and a common means for securing said spring and support to the axle.

In testimony whereof I affix my signature.

ALDEN L. PUTNAM.